United States Patent
Lutjen (10) Patent No.: US 10,208,674 B2
(45) Date of Patent: Feb. 19, 2019

(54) MULTI-AXIAL BRUSH SEAL

(71) Applicant: United Technologies Corporation, Hartforf, CT (US)

(72) Inventor: Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 215 days.

(21) Appl. No.: 14/774,303

(22) PCT Filed: Feb. 26, 2014

(86) PCT No.: PCT/US2014/018558
§ 371 (c)(1),
(2) Date: Sep. 10, 2015

(87) PCT Pub. No.: WO2014/158589
PCT Pub. Date: Oct. 2, 2014

(65) Prior Publication Data
US 2016/0040600 A1  Feb. 11, 2016

Related U.S. Application Data

(60) Provisional application No. 61/778,642, filed on Mar. 13, 2013.

(51) Int. Cl.
*F02C 7/28* (2006.01)
*F01D 11/02* (2006.01)
(Continued)

(52) U.S. Cl.
CPC ............... *F02C 7/28* (2013.01); *B23K 31/02* (2013.01); *F01D 11/003* (2013.01); *F01D 11/02* (2013.01);
(Continued)

(58) Field of Classification Search
CPC .... F02C 7/28; F02C 3/00; F01D 11/02; F01D 11/005; F01D 11/08;
(Continued)

(56) References Cited

U.S. PATENT DOCUMENTS 2,878,048 A * 3/1959 Peterson ............. F16C 33/78
277/355
4,580,346 A * 4/1986 Reichl ................. G01D 5/264
277/345
(Continued)

FOREIGN PATENT DOCUMENTS

JP    2002081552    3/2002

OTHER PUBLICATIONS

Machine Translation of JP 2002081552 A Yamashita, Tatsuo.*
(Continued)

*Primary Examiner* — Gerald L Sung
*Assistant Examiner* — Alain Chau
(74) *Attorney, Agent, or Firm* — Carlson, Gaskey & Olds, P.C.

(57) ABSTRACT

A seal assembly, includes a first brush supported between first and second plates, a second brush supported on the first and second plates transverse to the first brush seal, and a third plate attached to the second brush.

18 Claims, 5 Drawing Sheets

(51) Int. Cl.
 *F01D 11/08* (2006.01)
 *F16J 15/328* (2016.01)
 *F16J 15/3288* (2016.01)
 *F01D 11/00* (2006.01)
 *B23K 31/02* (2006.01)
 *F02C 3/00* (2006.01)

(52) U.S. Cl.
 CPC ............ *F01D 11/025* (2013.01); *F01D 11/08* (2013.01); *F02C 3/00* (2013.01); *F16J 15/328* (2013.01); *F16J 15/3288* (2013.01); *F05D 2240/56* (2013.01)

(58) Field of Classification Search
 CPC ........ F01D 11/001–11/008; F01D 11/25; F16J 15/3288; F16J 15/3284; F16J 15/328; F05D 2240/55; F05D 2240/56; F02K 1/805; B23K 31/02
 See application file for complete search history.

(56) References Cited

U.S. PATENT DOCUMENTS

| | | | | |
|---|---|---|---|---|
| 4,595,207 | A * | 6/1986 | Popp | F16J 15/3288 277/303 |
| 4,756,536 | A * | 7/1988 | Belcher | F01D 11/02 277/355 |
| 5,114,159 | A * | 5/1992 | Baird | F01D 5/10 277/355 |
| 5,474,305 | A * | 12/1995 | Flower | F16J 15/3288 277/355 |
| 5,474,306 | A * | 12/1995 | Bagepalli | F01D 9/023 277/355 |
| 5,480,162 | A | 1/1996 | Beeman, Jr. | |
| 5,597,167 | A * | 1/1997 | Snyder | F01D 11/00 277/355 |
| 5,609,469 | A * | 3/1997 | Worley | F01D 11/005 415/115 |
| 5,630,590 | A * | 5/1997 | Bouchard | F01D 11/001 277/301 |
| 6,131,910 | A * | 10/2000 | Bagepalli | F01D 5/225 277/355 |
| 6,170,831 | B1 | 1/2001 | Bouchard | |
| 6,308,957 | B1 * | 10/2001 | Wright | F16J 15/006 277/355 |
| 6,390,476 | B1 * | 5/2002 | Tong | F16J 15/3288 277/355 |
| 6,416,057 | B1 | 7/2002 | Adams et al. | |
| 6,428,009 | B2 | 8/2002 | Justak | |
| 6,499,742 | B1 | 12/2002 | Zhou et al. | |
| 6,540,231 | B1 | 4/2003 | Trantow et al. | |
| 6,622,490 | B2 * | 9/2003 | Ingistov | F01D 11/001 277/355 |
| 6,880,829 | B1 * | 4/2005 | Datta | F01D 11/08 277/350 |
| 6,913,265 | B2 | 7/2005 | Datta | |
| 7,093,835 | B2 | 8/2006 | Addis | |
| 8,556,578 | B1 * | 10/2013 | Memmen | F01D 5/189 277/644 |
| 8,632,075 | B2 * | 1/2014 | Sha | F01D 11/001 277/355 |
| 2002/0189096 | A1 * | 12/2002 | Flower | F16J 15/3268 29/888.3 |
| 2003/0131602 | A1 * | 7/2003 | Ingistov | F01D 11/001 60/772 |
| 2004/0041348 | A1 | 3/2004 | Addis | |
| 2005/0194747 | A1 * | 9/2005 | Morgan | F01D 9/023 277/358 |
| 2008/0063831 | A1 * | 3/2008 | Kanzaki | B32B 27/12 428/92 |
| 2010/0327534 | A1 | 12/2010 | Powar et al. | |
| 2012/0195741 | A1 * | 8/2012 | Sarawate | F01D 11/001 415/170.1 |
| 2013/0033008 | A1 | 2/2013 | Martin et al. | |
| 2013/0038022 | A1 | 2/2013 | Sha | |
| 2013/0154199 | A1 * | 6/2013 | Williams | F02C 7/28 277/549 |
| 2013/0170979 | A1 * | 7/2013 | Sha | F01D 11/001 415/229 |
| 2015/0345640 | A1 * | 12/2015 | Inoue | F01D 11/001 277/355 |

OTHER PUBLICATIONS

International Preliminary Report on Patentability for PCT Application No. PCT/US2014/018558, dated Sep. 24, 2015.
International Search Report and Written Opinion for Application No. PCT/US2014/018558 dated Jun. 3, 2014.

* cited by examiner

MULTI-AXIAL BRUSH SEAL

BACKGROUND

The present disclosure relates generally to turbine engine seals, and more specifically to a multi-axial brush seal for a turbine engine.

Gas turbine engines typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Seals are utilized within the gas turbine engine to prevent the exhaust gas flow from impinging on components outside of the gas flow path. Conformal seals fabricated from formed sheet metal parts that bias against sealing faces are typically utilized to seal against the exhaust gas flows. Such seals are subject to high temperatures at the sealing faces. The high temperatures combined with wear and expansion can lead to performance loss due to leakage through the conformal seals.

Accordingly, it is desirable to develop and design improved seals that are capable of performing in the high temperature environment that have increased performance life.

SUMMARY

A seal assembly according to an exemplary embodiment of this disclosure, among other possible things includes a first brush supported between first and second plates, a second brush supported on the first and second plates transverse to the first brush seal; and a third plate attached to the second brush.

In a further embodiment of the foregoing seal assembly, the seal assembly is annular, the first brush extends radially inward, and the second brush extend transverse to the first brush seal.

In a further embodiment of the foregoing seal assembly, the seal assembly is annular, the second brush extends radially, and the first brush seal extends transverse to the second brush.

In a further embodiment of the foregoing seal assembly, at least a first portion of the second brush is angled radially outward relative to at least one of the first and second plate, and at least a second portion of the second brush is angled radially outward relative to at least one of the first and second plate, and the first portion and the second portion contact each other.

In a further embodiment of the foregoing seal assembly, the first brush comprises an inner brush angled in a first direction and an outer brush angled in a second direction opposed to the first direction.

In a further embodiment of the foregoing seal assembly, first brush seal comprises a third brush, such that the seal assembly is a four point seal assembly configured to provide sealing out four positions.

In a further embodiment of the foregoing seal assembly, the first brush includes bristles oriented in different directions relative to their circumferential positions about the first plate.

In a further embodiment of the foregoing seal assembly, the bi-directional brush includes at least two bristlepacks, each of the at least two bristlepacks is angled relative to the first brush seal.

A method according to an exemplary embodiment of this disclosure, among other possible things includes joining a first plate and a second plate to define a u-shaped cross section with a radially inward facing opening, inserting a first bristlepack into the opening, positioning a second bristlepack adjacent the u-shaped radial cross section and transverse to the first bristlepack, and joining a third plate to the second bristlepack.

In a further embodiment of the foregoing method, the step of joining the first and second plate further includes welding the first and second plate together.

In a further embodiment of the foregoing method, the step of inserting a first bristlepack into the interior opening is performed during the step of joining the first and a second plate and prior to welding the first and second plate together.

In a further embodiment of the foregoing method, machining a radially outward surface defined by the joined first and second plate, positioning at least a second bristlepack in contact with the radially outward surface, the at least a second bristlepack is oriented transverse to the first bristlepack, placing a third plate in contact with at least a second bristlepack and transverse to the first bristlepack, and securing the third plate and the at least a second bristlepack to the joined first and second plate via a weld process.

In a further embodiment of the foregoing method, the second bristlepack is positioned adjacent a base portion of the u-shaped radial cross section.

A further embodiment of the foregoing method includes placing a third bristlepack adjacent the base portion such that the second bristlepack extends axially beyond the base portion in a first direction and the third bristlepack extends axially beyond the base portion in a second direction, transverse to the first direction.

A further embodiment of the foregoing method includes joining the third plate to the third bristlepack.

A turbine engine according to an exemplary embodiment of this disclosure, among other possible things includes a compressor section, a combustor in fluid communication with the compressor section, a turbine section in fluid communication with the combustor, a seal assembly within at least one of the compressor section, the combustor, and the turbine section, the seal assembly including a first brush supported between first and second plates, and a second brush supported on the first and second plates transverse to the first brush and a third plate attached to the second brush.

In a further embodiment of the foregoing turbine engine, the seal assembly provides a first brush seal against a rotating component radially inward of the seal, a second seal against a first engine component fore of the seal assembly relative to a fluid flow path, and a third seal against a second engine component aft of the seal assembly relative to the fluid flow path.

In a further embodiment of the foregoing turbine engine, the seal assembly is maintained in position within the turbine engine via a spring force generated by contact between the second brush and the first engine component, and a spring force generated by contact between the second brush and second engine component.

In a further embodiment of the foregoing turbine engine, the first brush seal includes a plurality of bristles angled with a direction of rotation of the rotating component, and a plurality of bristles angled against a direction of rotation of the rotating component.

In a further embodiment of the foregoing turbine engine, the seal assembly is a circumferential seal and includes a gap, operable to allow for thermal expansion and contraction.

BRIEF DESCRIPTION OF THE DRAWINGS

Figure 1:
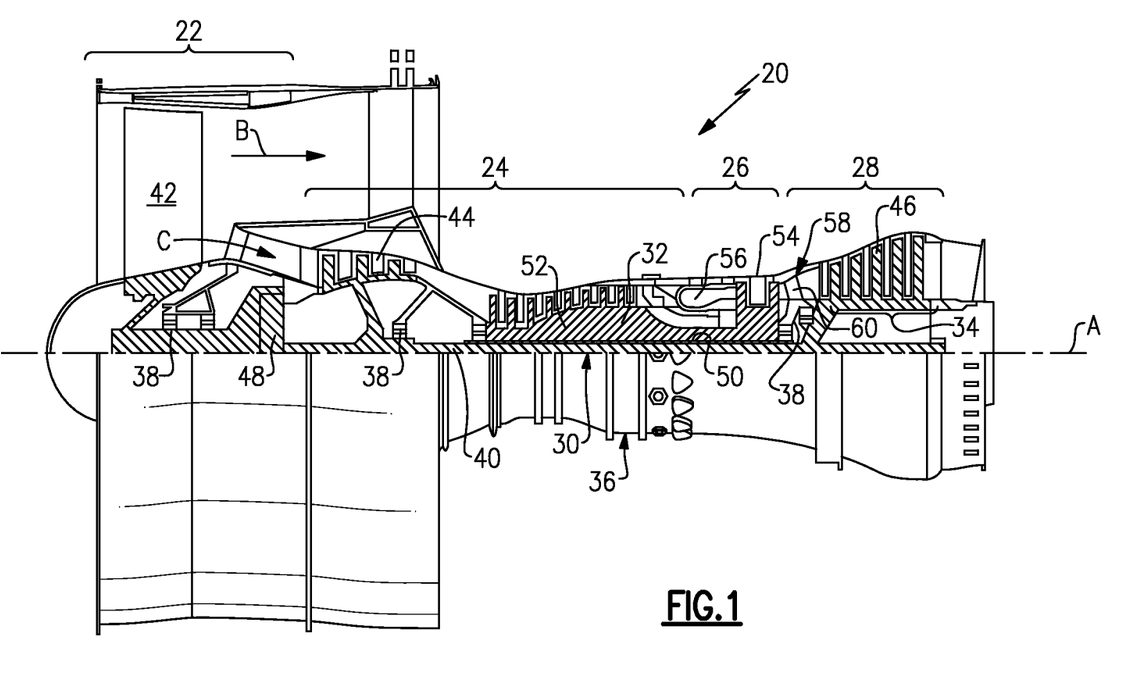
FIG. 1 schematically illustrates an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines, such as, for example, a turbine engine including a three-spool architecture in which three spools concentrically rotate about a common axis where a low speed spool enables a low pressure turbine to drive a fan via a gearbox, an intermediate spool enables an intermediate pressure turbine to drive a first compressor of the compressor section, and a high spool enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram} \,°\, R)/(518.7°\, R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Seals are utilized throughout the engine 20 to maintain the high temperature exhaust gases within the defined gas path. Moreover, seals are provided between moving and static parts to prevent leakage of exhaust gases.

Figure 2:
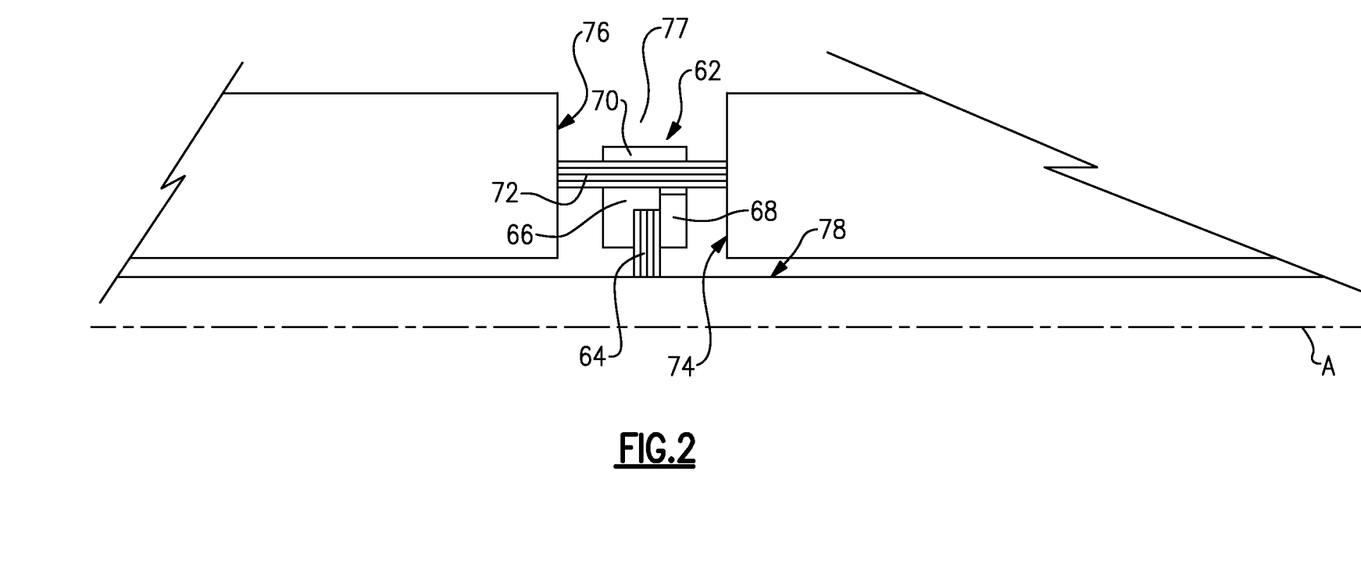
FIG. 2 schematically illustrates an example tri-axial brush seal.

Referring to FIG. 2, an example tri-way seal 62 is disposed between axial surfaces 74 and 76 and a radial surface 78. Each of the surfaces 74 and 76 are engine component surfaces and define a gap 77 through which gas can escape absent the tri-way seal 62. The tri-way seal 62 includes a bi-directional bristle 72 that is compressed between the axial surfaces 74, 76 and a single bristle 64 that rides on the radial surface 78. The axial compression of the bi-directional bristle 72 maintains the tri-way seal 62 in position in the engine 20. The tri-way seal 62 includes a first plate 66 that is attached to a second plate 68 with the single bristle 64 disposed therebetween. As shown in FIG. 2, the first plate 66 and the second plate 68 together define a U-shaped radial cross-section with a radially inward facing opening. A third plate 70 is attached atop the bi-direction bristles 72 and the first and second plates 66, 68. The bristles 64, 72 are in sealing contact with corresponding surfaces 74, 76 and 78 to provide the desired sealing of exhaust gases and/or air. In some examples, the plates 66, 68, 70 are joined to each other and to the bristles 64, 72 via a weld.

Figure 3:
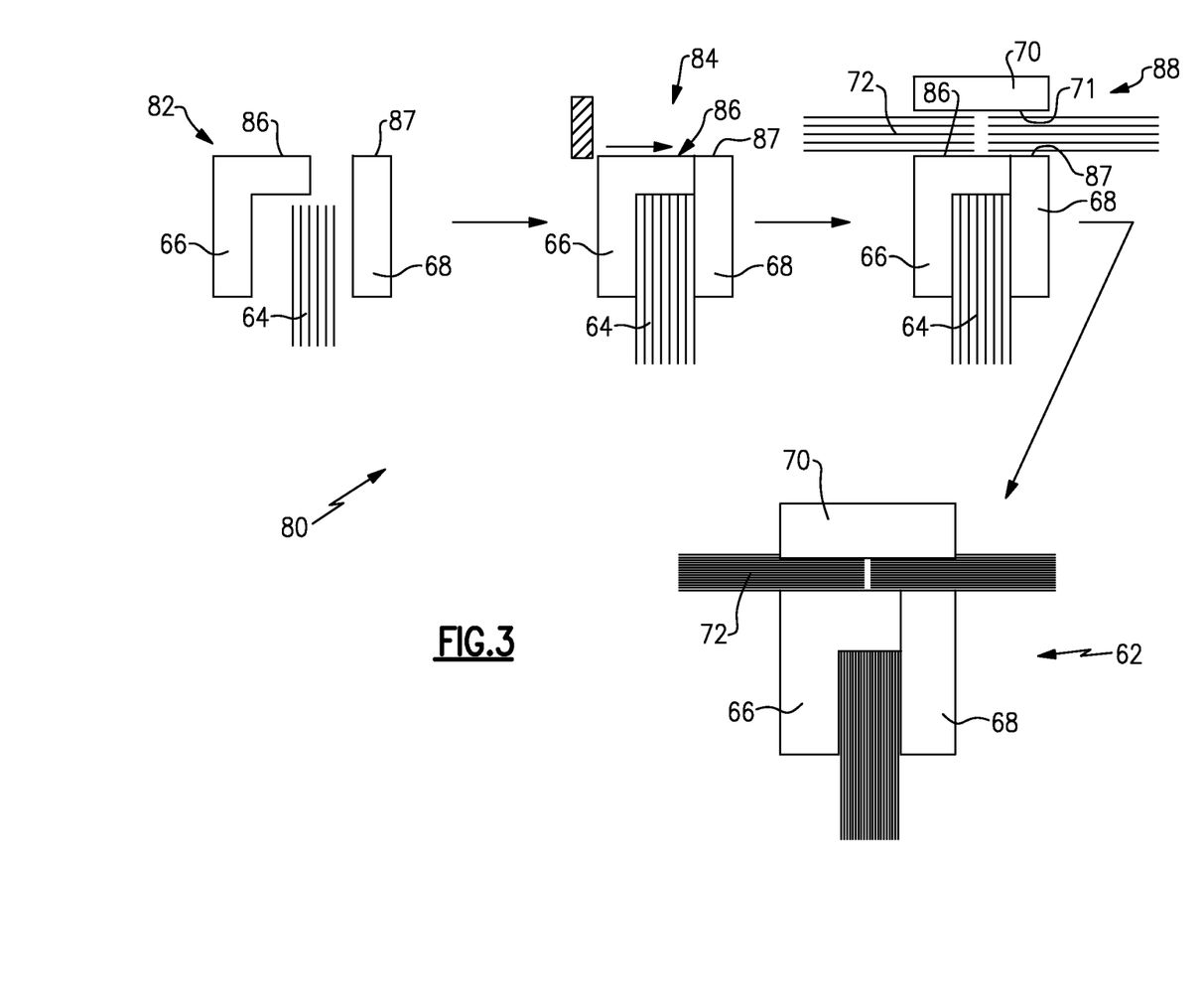
FIG. 3 schematically illustrates a fabrication process for fabricating a tri-axial brush seal.

Referring to FIG. 3, the example seal is fabricated according to a process schematically indicated at 80. The process includes multiple steps, and starts by forming the first plate 66 as a substantially L-shaped part to receive the bristle 64. The second plate 68 may be formed as a substantially rectangular shaped component, and joined with the substantially L-shaped plate 66 to define a U-shape with the opening in the U-shape facing radially inward. In an alternate example, each of the plates 66, 68 can be substantially L-shaped. The bristle 64 is received within the gap formed by the L-shaped first plate 66 and the second plate 68. An initial step in the process, indicated at 82, includes welding the bristle pack 64 in place in the gap between the first plate 66 and the second plate 68. The bristle 64 and plates 66, 68 are formed of a metal material compatible with a welding process. It is within the contemplation of this disclosure that any welding process or other metallurgical bonding process may be utilized to make the desired weld and attachment between the bristle 64 and plates 66, 68, and between each plate 66, 68 and the plates 66, 68 contacting it.

Continuing with FIG. 3, at step 84, the top surface 86 defined by plates 66, 68 is machined flat. The joint between the first plate 66 and the second plate 68 is machined along with the top surface 86, 87 of the plates 66, 68 to provide a uniform flat surface that receives the bi-direction bristle 72. In some examples, an interior surface 71 of the top plate 70 is also machined smooth, further facilitating the joint between the bristles 72 and the plates 66, 68, 70.

Once the top surface 86 is machined to a desired finish, the bristles 72 and third plate 70 are attached to the first and second plates 66, 68 as illustrated at step 88. Attaching the bristles 72 and the third plate 70 is also a welding process and provides a structurally integral and complete seal 62. In some examples, the bristles 72 are a single group of bristles (or bristlepack) that extends axially beyond both sides of the top surface 86. In alternate examples, the bristles 72 are two or more bristlepacks with each bristlepack extending beyond one axial side of the top surface and meeting each other adjacent to the top surface 86.

Figures 4, 5:
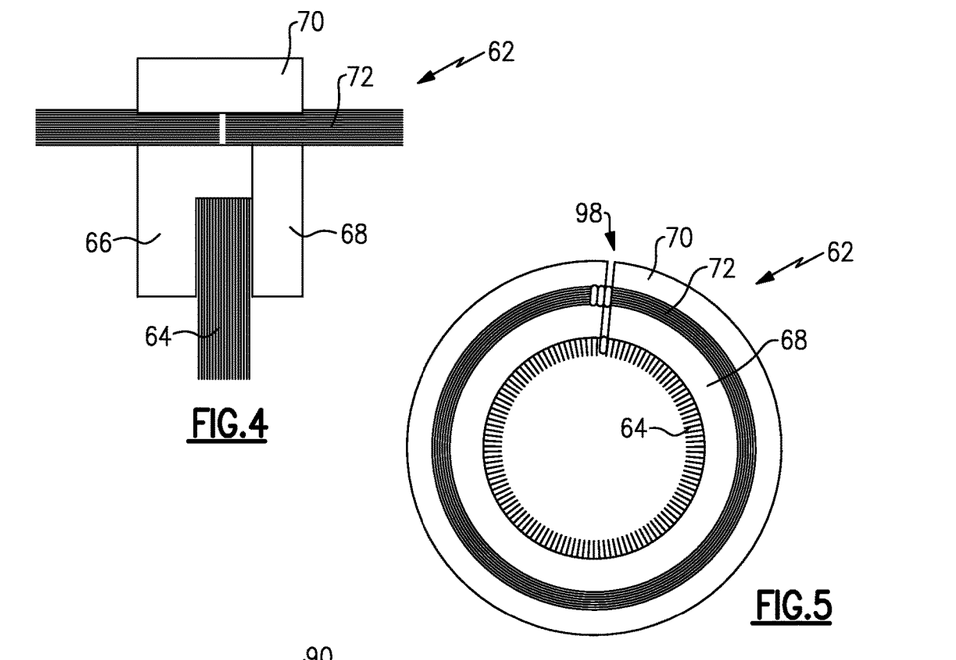
FIG. 4 illustrates a radial cross section of an example tri-axial brush seal.
FIG. 5 illustrates a fore view of an example tri-axial brush seal.

Referring to FIGS. 4 and 5, the seal 62 is an annular part with the bristle 64 extending radially inward of the radially inward most surface of the second plate 68. The bristles 72 extend axially (e.g., out of the page in FIG. 5), transverse to the radially inward bristles 64. The seal 62 may include a split 98 (alternately referred to as a gap) to accommodate thermal expansion of the sealed gap during operation of the turbine engine.

Figures 6, 7:
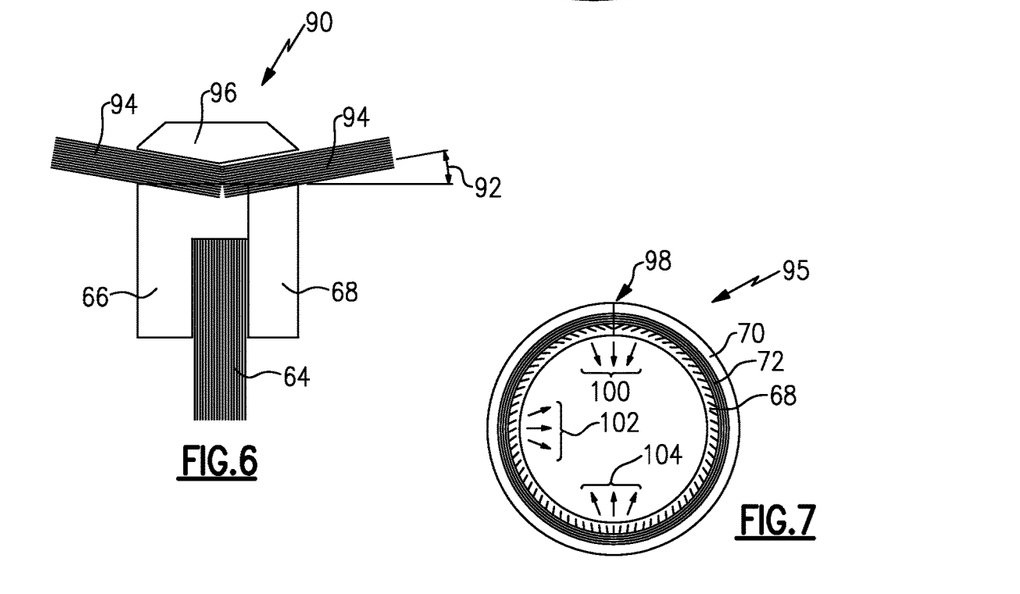
FIG. 6 illustrates a radial cross-sectional view of an alternate example tri-axial brush seal.
FIG. 7 illustrates a fore view of another example tri-axial brush seal.

Referring to FIG. 6, an alternate tri-way seal 90 is disclosed and includes bristles 94 that have a radial component to ease assembly. The bristles 94 are angled radially outward at an angle 92. The outward angle 92 eases assembly and resists radial movement once the seal assembly 90 is installed in the gas turbine engine. Moreover, the radially inward bristles 94 can provide further accommodation of relative thermal movement between sealing surfaces by providing a flexing angle while still maintaining a sealing contact.

Referring to FIG. 7, another seal 95 includes radially inward extending bristles 100, 102 and 104 that vary in angle relative to the plates depending on their circumferential position. As shown, the example seal 95 includes bristles about the entire inner circumference with only a few groups highlighted for exemplary purposes. Each group of bristles 100, 102 and 104 include bristles that are orientated and angled at different angles relative to the plates depending on a circumferential position about, e.g., second plate 68. The bristles 100, 102, 104 are normally extended inwardly toward a center axis and transverse from the plates. In this example, some groups of bristles 100, 102, 104 extend at different angles depending on the relative circumferential position with the angle of the bristles 104 radially opposite the split 98 being the smallest and the angle of the bristles 102, 100 increasing as the bristles 100, 102 approach the split 98. It will be appreciated that the positions of the bristles 100, 102 and the various orientations thereof could be adapted to correspond to specific sealing surface geometries or sealing requirements.

Figure 8:
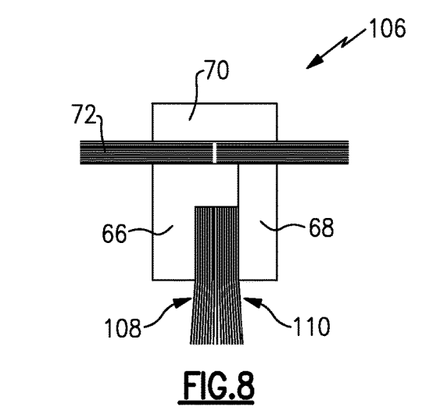
FIG. 8 illustrates a radial cross-sectional view of another alternate example tri-axial brush seal.
Figure 9:
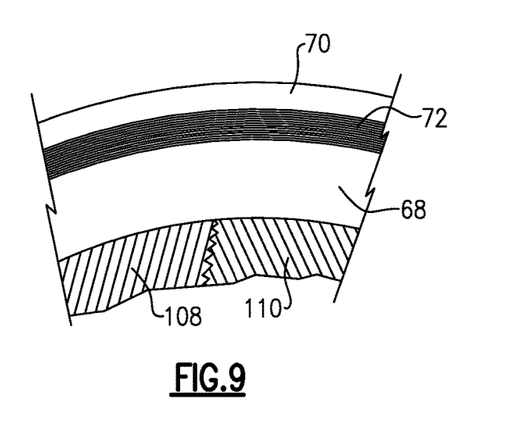
FIG. 9 illustrates a sectional fore view of the example tri-axial brush seal of FIG. 8.

Referring to FIGS. 8 and 9 another exemplary seal 106 includes bristles 108, 110 angled in opposed circumferential directions. The bristles 108, 110 are secured between the first and second plates 66, 68 but are angled in opposing directions. The opposing bristles 108, 110 can provide improved sealing and also provide for the adaptation to specific radial sealing surfaces.

Figure 10:
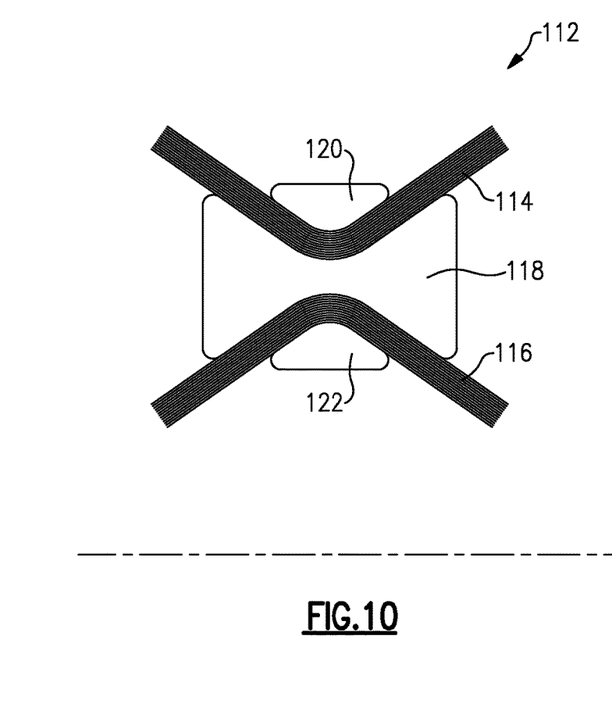
FIG. 10 illustrates a radial cross sectional view of an example quad axial brush seal.

Referring to FIG. 10, another example multi-axial seal 112 includes first and second bristles 114, 116 that each extend at an angle from a center block 118. First and second side blocks 120 and 122 are attached to the center block over the corresponding first and second bristles 114, 116 via a welding process. The first and second bristles 114 and 116 extend at an angle to provide additional sealing and to provide a seal compatible with more than three sealing surfaces. Moreover, the example multi-axial seal 112 could be utilized between just two axially facing sealing surfaces. It is further contemplated that additional bristle/block configurations can be utilized and still fall within the instant disclosure.

Accordingly, the disclosed brush seals provide better temperature compatibility and performance retention in applications previously utilizing conformal metal seals.

Additional information with regards to the present disclosure can be found in U.S. Provisional application No. 61/778,642, which is herein incorporated by reference, and is attached herein as appendix A.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An annular seal assembly defining an axis, comprising:
a first brush supported between first and second plates and extending radially inward with respect to the axis;
a second brush supported on and in direct contact with radially outward facing surfaces of the first and second plates transverse to the first brush, the second brush having at least a first portion extending in a first axial direction and a second portion at least partially extending in a second axial direction opposite to the first axial direction, the first portion being angled radially outward relative to the axis defined by the seal assembly and the second portion being angled radially outward relative to the axis defined by the seal assembly; and
a third plate attached to the second brush.

2. The seal assembly as recited in claim 1, wherein said first portion and said second portion contact each other.

3. The seal assembly as recited in claim 1, wherein the first brush comprises an inner brush angled in a first direction and an outer brush angled in a second direction opposed to the first direction.

4. The seal assembly of claim 3, wherein said seal assembly comprises a third brush, such that said seal assembly is a four point seal assembly configured to provide sealing at four positions.

5. The seal assembly as recited in claim 1, wherein the first brush includes bristles oriented in different directions relative to their circumferential positions about the first plate.

6. The seal assembly of claim 1, wherein the second brush comprises at least two bristlepacks, wherein each of said at least two bristlepacks is angled relative to said first brush.

7. The seal assembly of claim 1, wherein the first portion of the second brush defines a first angle relative to the axis and the second portion of the second brush defines a second angle relative to the axis, the second angle being distinct from the first angle.

8. A method for assembling an annular seal assembly defining an axis, the method comprising the steps of:
joining a first plate and a second plate to define a u-shaped radial cross section with a radially inward facing opening, relative to said axis;
inserting a first bristlepack into the radially inward facing opening;
positioning a second bristlepack adjacent to, and in direct contact with, said u-shaped radial cross section and transverse to said first bristlepack such that a first portion of the second bristlepack extends in a first axial direction and is angled radially outward relative to the axis, and a second portion of the second bristlepack extends in a second axial direction that is opposite the first axial direction and is angled radially outward relative to the axis; and
joining a third plate to said second bristlepack.

9. The method of claim 8, wherein the step of joining the first and second plate further comprises welding said first and second plate together.

10. The method of claim 9, wherein the step of inserting a first bristlepack into the radially inward facing opening is performed during said step of joining the first and a second plate and prior to welding said first and second plate together.

11. The method of claim 8, wherein the second bristlepack is positioned adjacent a base portion of said u-shaped radial cross section.

12. The method of claim 11, further comprising placing a third bristlepack adjacent said base portion such that said second bristlepack extends axially beyond said base portion in a first direction and said third bristlepack extends axially beyond said base portion in a second direction, transverse to said first direction.

13. The method of claim 12, further comprising joining the third plate to said third bristlepack.

14. A turbine engine, comprising:
a compressor section;
a combustor in fluid communication with the compressor section;
a turbine section in fluid communication with the combustor, an annular seal assembly within at least one of said compressor section, said combustor, and said turbine section, said annular seal assembly defining an axis and including a first brush supported between first and second plates and extending radially inward relative to the axis, and a second brush supported on, and in direct contact with, the first and second plates transverse to the first brush, the second brush having at least a first portion extending in a first axial direction and a second portion extending in a second direction opposite the first axial direction, the first portion being angled radially outward relative to the axis defined by the annular seal assembly and the second portion being angled radially outward relative to the axis defined by the annular seal assembly, and a third plate attached to the second brush.

15. The turbine engine of claim 14, wherein said annular seal assembly provides a first seal against a rotating component radially inward of said annular seal assembly, a second seal against a first engine component fore of said seal assembly relative to a fluid flow path, and a third seal against a second engine component aft of said annular seal assembly relative to said fluid flow path.

16. The turbine engine of claim 15, wherein said annular seal assembly is maintained in position within the turbine engine via a spring force generated by contact between said second brush and said first engine component, and a spring force generated by contact between said second brush and second engine component.

17. The turbine engine of claim 15, wherein said first brush seal comprises a plurality of bristles angled with a direction of rotation of the rotating component, and a plurality of bristles angled against a direction of rotation of the rotating component.

18. The turbine engine of claim 14, wherein said annular seal assembly is a circumferential seal and includes a gap, operable to allow for thermal expansion and contraction.

* * * * *